United States Patent [19]

Hayashi

[11] Patent Number: 5,707,267
[45] Date of Patent: Jan. 13, 1998

[54] DISCHARGE CHAMBER AND METHOD OF MANUFACTURING THE SAME

[75] Inventor: Masatake Hayashi, Kanagawa, Japan

[73] Assignee: Sony Corporation, Tokyo, Japan

[21] Appl. No.: 694,215

[22] Filed: Aug. 8, 1996

Related U.S. Application Data

[62] Division of Ser. No. 384,232, Feb. 6, 1995, Pat. No. 5,570,104, which is a continuation of Ser. No. 197,309, Feb. 16, 1994, abandoned.

[30] Foreign Application Priority Data

Feb. 24, 1993 [JP] Japan .................. P05-059664

[51] Int. Cl.⁶ ........................................... H01J 9/40
[52] U.S. Cl. ................................. 445/24; 445/25
[58] Field of Search ......................... 445/24, 25, 50

[56] References Cited

U.S. PATENT DOCUMENTS

5,041,759  8/1991  Kwon et al. ................ 313/497 X

Primary Examiner—Kenneth J. Ramsey
Attorney, Agent, or Firm—Hill, Steadman & Simpson

[57] ABSTRACT

A discharge chamber wherein the allowability for positional displacement of electrodes is increased to facilitate manufacture of the discharge chamber and a method of manufacturing the discharge chamber are disclosed. The discharge chamber has a flat panel structure wherein a first substrate and a second substrate are adhered to each other with a predetermined gap left therebetween. Striped anodes and cathodes are arranged alternately on the first substrate. Barrier ribs are interposed between the two substrates and arranged in a stripe pattern to partition the gap to form discharge channels. The anodes are arranged just below the barrier ribs and have a width dimension smaller than the width dimension of the barrier ribs. Meanwhile, each of the cathodes is arranged intermediately between each adjacent ones of the cathodes. Even if the barrier ribs suffer from relative positional displacement, the exposed surface area of the cathodes by which plasma discharge is dominated is kept fixed.

7 Claims, 7 Drawing Sheets

DISCHARGE CHAMBER AND METHOD OF MANUFACTURING THE SAME

This is a division of application Ser. No. 08/384,232, filed Feb. 6, 1995, now U.S. Pat. No. 5,570,104, which is a continuation of Ser. No. 08/197,309 filed Feb. 16, 1994 (abandoned).

BACKGROUND OF THE INVENTION

1. Field of the Invention

This invention relates to a discharge chamber incorporated in a plasma addressed display device or a like device and a method of manufacturing the same, and more particularly to an electrode structure of a discharge chamber having a linear discharge channel and a method of forming the electrode structure.

2. Description of the Related Art

Figure 5:
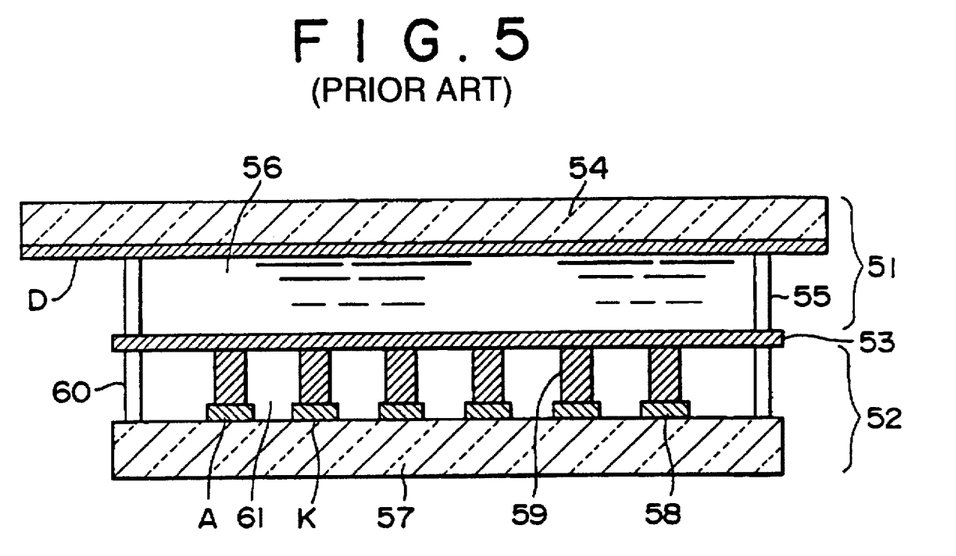
FIG. 5 is a sectional view of another plasma addressed display device in which a conventional discharge chamber is incorporated.

A plasma addressed display device in which a discharge chamber having a linear discharge channel is incorporated is already known and disclosed, for example, in Japanese Patent Laid-Open Application No. Heisei 4-265931, which corresponds to U.S. Patent application Ser. No. 07/837,971 filed on Feb. 20, 1992, now U.S. Pat. No. 5,244,427 and assigned to the assignee of the present patent application. In order to clearly show the background of the invention, an outline of the structure of a conventional plasma addressed display device is described with reference to FIG. 5. The plasma addressed display device shown has a structure wherein a display chamber 51, a discharge chamber 52 and an intermediate substrate 53 are layered with each other with the intermediate substrate 53 interposed between the display chamber 51 and the discharge chamber 52. The display chamber 51 is constructed using an upper side glass substrate 54 and has a plurality of signal electrodes D formed in parallel to each other in the direction of a column of a matrix on an inner major surface thereof. The glass substrate 54 is adhered to the intermediate substrate 53 with a predetermined gap left therebetween by means of a spacer 55. A liquid crystal layer 56 is filled in the gap. Meanwhile, the discharge chamber 52 is constructed using a lower side glass substrate 57. A plurality of plasma electrodes 58 are formed on an inner side major surface of the substrate 57 such that they extend in the direction of a row of the matrix perpendicularly to the signal electrodes D. The plasma electrodes 58 alternately functions as an anode A and a cathode K. A plurality of barrier ribs 59 are formed on and along the plasma electrodes 58. The barrier ribs 59 contact at the top ends thereof with the intermediate substrate 53 and serve as a spacer. The lower side glass substrate 57 is adhered to the intermediate substrate 53 by means of a seal member 60. An airtight enclosed space is defined between the lower side glass substrate 57 and the intermediate substrate 53. The space is partitioned by the striped barrier ribs 59 to construct discharge channels 61 which individually make row scanning units. Ionizable gas is enclosed in the individual discharge channels 61.

Figure 6:
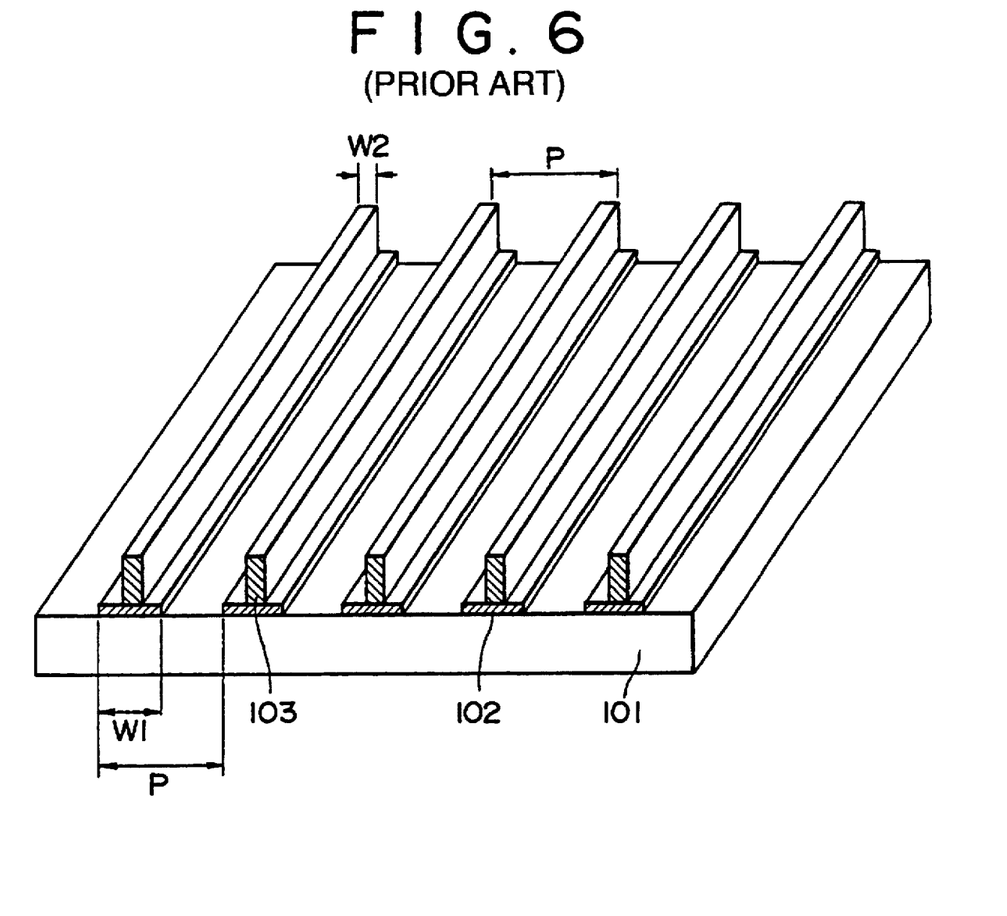
FIG. 6 is a perspective view showing a conventional discharge chamber electrode structure.

FIG. 6 schematically shows an electrode structure of a conventional discharge chamber. A plurality of electrodes 102 patterned in stripes are formed on a surface of a substrate 101. The striped electrodes 102 are arranged in a spaced relationship by a pitch P and individually have a width dimension W1. A barrier rib 103 is formed on each of the striped electrodes 102. Also the striped barrier ribs 103 are arranged in a spaced relationship by the same pitch P and individually have a width dimension W2 which is set smaller than the width dimension W1 of the striped electrodes 102.

Figure 7:
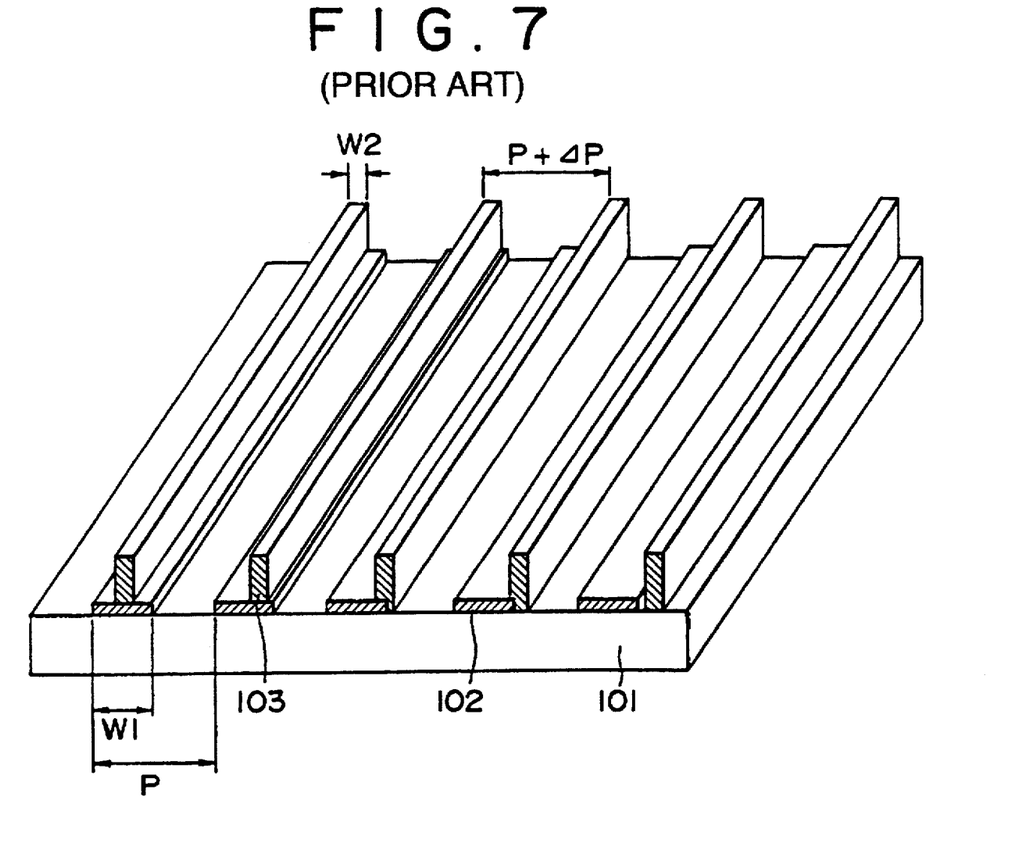
FIG. 7 is a similar view but illustrating a subject to be solved of a method of manufacturing a conventional discharge chamber.

A subject to be solved by the invention will be described with reference to FIG. 7 which shows the striped electrodes 102 and the striped barrier ribs 103 formed by different pitches from each other with respect to the condition shown in FIG. 6. Such a striped pattern as shown in FIG. 7 is formed generally using a mask. Although the electrodes 102 and the barrier ribs 103 originally have an equal pattern arrangement pitch P, they have different width dimensions W1 and W2 from each other. Accordingly, the mask employed for formation of the electrodes 102 and the mask employed for formation of the barrier ribs 103 are conventionally different from each other. In this instance, in order to align the electrodes 102 and the barrier ribs 103 with each other, the two masks for them have an equal striped pattern pitch and are aligned accurately with each other.

For formation of electrodes or barrier ribs, a thick film printing procedure using a screen mask is employed usually. The screen mask includes a frame on which a screen mesh is stretched under tension. Photolithography is applied to a screen mesh to which a photosensitive agent is applied to form a predetermined mask pattern. However, since the screen mesh is stretched under tension, it is difficult to set the pitches of striped patterns to a completely equal value between different screen masks, and actually, a fixed pitch error $\Delta P$ is involved between the two pitches P. In addition, when thick film printing is performed, a pressure is applied to the screen mask by a squeegee to deform the screen mask. The degree of such deformation is delicately different between individual screen masks, and the pitch of a striped pattern actually printed is deviated from an aimed value. Consequently, it is actually difficult to align the lower layer electrodes 102 and the upper layer barrier ribs 103 actually with each other, and there is a subject to be solved in that a pitch error is resulted from the difficulty.

Figure 8A:
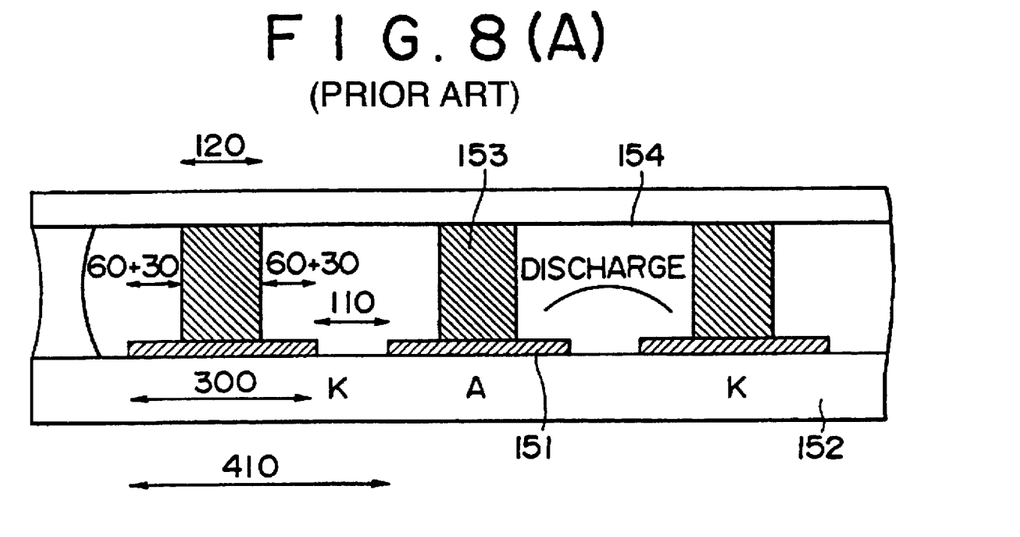
FIGS. 8(A) and 8(B) are schematic sectional views illustrating a structural subject to be solved of the conventional discharge chamber.
Figure 8B:
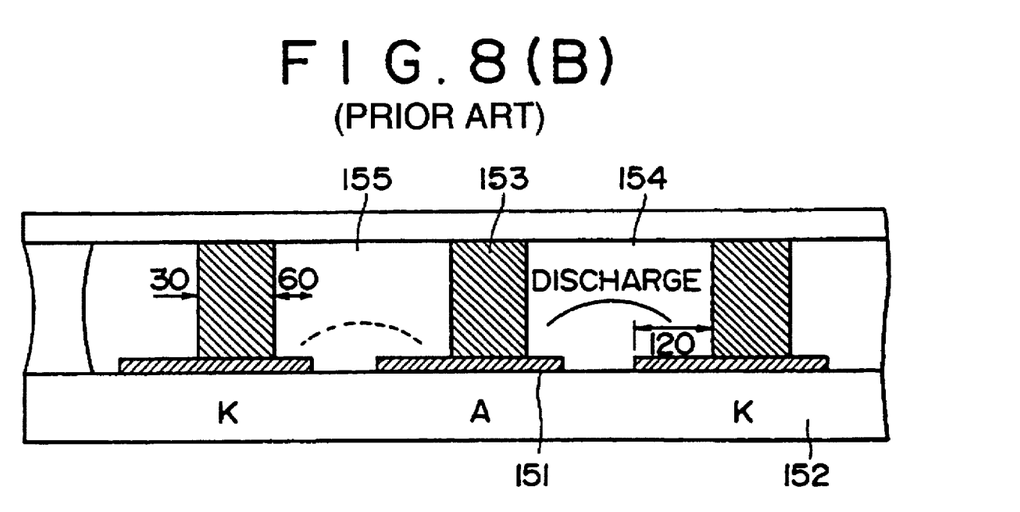

If there is some relative positional displacement between the electrodes and the barrier ribs, then the problem arises that operation of the discharge chambers becomes unstable. This will be described briefly specifying detailed dimensions with reference to FIGS. 8(A) and 8(B). In particular, FIG. 8(A) shows electrodes and barrier ribs which have no relative positional displacement from each other. A plurality of plasma electrodes 151 alternately function as an anode A and a cathode K and are arranged by the pitch of, for example, 410 µm on a substrate 152. A barrier rib 153 is formed in an overlapping relationship with and on each of the plasma electrodes 151. The width dimension of the barrier ribs 153 is set to 120 µm, and the width dimension of the plasma electrodes 151 is set to 300 µm. A linear discharge channel 154 is formed between each adjacent ones of the barrier ribs 153, and an anode A and an adjacent cathode K are partially exposed in the inside of the linear discharge channel 154. Plasma discharge is produced by application of a predetermined voltage between the anode A and the cathode K. In order to stably maintain the plasma discharge, a fixed electrode exposed area must necessarily be assured. Particularly the exposed area of the cathode K is dominant, and the exposed electrode width of at least 60 µm must necessarily be assured. In this instance, if it is assumed that the positioning error between the barrier ribs 153 and the electrodes 151 is approximately ±30 µm to the utmost, the exposed electrode width of at least 90 µm must necessarily be assured on the opposite sides of each barrier rib 153 as seen from FIG. 8(A). Consequently, in the arrangement shown in FIG. 8(A), the width of the electrodes is set to 300 µm and the width of the barrier ribs is set to 120 µm. As a result, only an opening width of 110 µm can be taken between each adjacent anode A and cathode K, which results in sacrifice of the contrast as considered as a display device. Further, FIG. 8(B) shows electrodes and barrier ribs between which positional displacement of 30 µm is exhibited. In this instance, in a discharge channel 155, the exposure width of the cathode K is 60 µm which is a minimum required value. Should positioning displacement of a larger dimension occur, the plasma discharge in the discharge channel 155 will be very unstable. On the other hand, in an adjacent discharge channel 154, the exposure width of the cathode K increases up to 120 µm, and consequently, stabilized discharge is obtained. In this manner, with the conventional structure described above, if positioning displacement occurs between the barrier ribs and the electrodes, then the discharge channels alternately present different intensities of plasma, and consequently, there is a subject to be solved in that the picture quality is deteriorated by such alternate different intensities of plasma as considered as the entire display device.

SUMMARY OF THE INVENTION

It is an object of the present invention to provide an electrode structure which can maintain stable plasma discharge even when relative positional displacement is presented between plasma electrodes and barrier ribs.

In order to attain the object described above, according to an aspect of the present invention, there is provided a discharge chamber, which comprises first and second substrates arranges substantially in parallel to each other to define a space which is filled with an ionizable gas, a plurality of barrier ribs arranged in the space to define a plurality of plasma discharge channels, a plurality of anodes each of which is located underneath one of the barrier ribs, each of the anodes having a width larger than the barrier rib, and a plurality of cathodes each of which is arranged in the middle of the adjacent barrier ribs. Preferably, the anodes and cathodes are formed on an inner surface of the first substrate by a printing procedure. Preferably, the barrier ribs are formed by a printing procedure. The barrier ribs may have an upper surface which contacts the second substrate. each one of the plasma discharge channels may comprise a pair of anodes, one of cathodes located between the pair of anodes, and a pair of barrier ribs each of which corresponds to each of the pair of anodes.

In the discharge chamber, the anodes are arranged just below the barrier ribs and have a width dimension greater than the width dimension of the barrier ribs so that the surfaces of them may be exposed partially. Meanwhile, each cathode is arranged intermediately between adjacent ones of the barrier ribs and is exposed entirely. Accordingly, even if relative positional displacement is presented between the plasma electrodes and the barrier ribs, since such an extreme condition wherein the barrier ribs extend to the regions of the cathodes is not presented normally, the relative positional displacement does not have an influence at least upon the cathodes. As a result, the exposed cathode area which is dominant over plasma discharge can be assured irrespective of such positional displacement, and consequently, the stability of plasma discharge can be improved. On the other hand, as for the anodes, since they are arranged just below the barrier ribs, each of them is exposed partially on the opposite sides thereof. Accordingly, if some relative positional displacement is presented between the plasma electrodes and the barrier ribs, the widths of the exposed portions of the anodes are varied from each other. However, since the anodes are required only to discharge therefrom, they are required only to have a certain exposure area, and the variation of the exposure areas does not have an influence very much upon the stability of plasma discharge.

Further, since the allowability for relative positional displacement of the barrier ribs from the plasma electrodes is increased due to the arrangement of the anodes, cathodes and barrier ribs described above, manufacture of the discharge chamber is facilitated, and the discharge chamber can be manufactured so as to have an increased size and a higher definition. Further, since stable plasma discharge operation is allowed, where the discharge chamber is applied to a display device, a high picture quality can be assured. Further, when it is tried to manufacture the discharge chamber with such an allowability for positional displacement as in conventional discharge chambers, the opening rate can be raised, and consequently, a high picture quality can be achieved and reduction in power for backlight can be achieved.

According to another aspect of the present invention, the discharge member is manufactured by a method of manufacturing a discharge chamber which comprises first and second substrates defining therebetween a space filled with an ionizable gas, which comprises the steps of forming a plurality of striped electrodes on a surface of the first substrate by a printing procedure, the electrodes comprising anodes and cathodes, forming a plurality barrier ribs on the anodes by a printing procedure so that each of the barrier ribs has a width smaller than the anodes, and filling the space between the first and second substrates with the ionizable gas. The barrier ribs may be located so as to define a plurality of plasma discharge channels.

By the manufacturing method, the discharge chamber of the present invention having such advantages as described above can be manufactured readily.

According to a further aspect of the present invention, there is provided a plasma addressed display device, which comprises a display chamber having a plurality of signal electrodes arranged in parallel to each other, and a discharge chamber, associated with the display chamber, having a plurality of discharge channels, the signal electrodes and discharge channels being arranged so that they are spaced apart in the vertical and horizontal directions, respectively, the discharge chamber having a plurality of striped anodes formed on a substrate, a plurality of striped cathodes formed between the anodes, and a plurality of barrier ribs formed on the anodes, each of the anodes having a width larger than the barrier rib. Preferably, the anodes and cathodes are formed by a printing procedure. Preferably, the barrier ribs are formed by a printing procedure. Each of the discharge channels may comprise a pair of anodes, one of cathodes located between the pair of anodes, and a pair of barrier ribs each of which corresponds to each of the pair of anodes. The display chamber and discharge chamber may be combined through a dielectric sheet. Each barrier rib may have an upper end which contacts the dielectric sheet.

With the plasma addressed display device, since the discharge chamber of the present invention having such advantages as described above is incorporated, a high picture quality is assured and reduction in power for backlight can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1A:
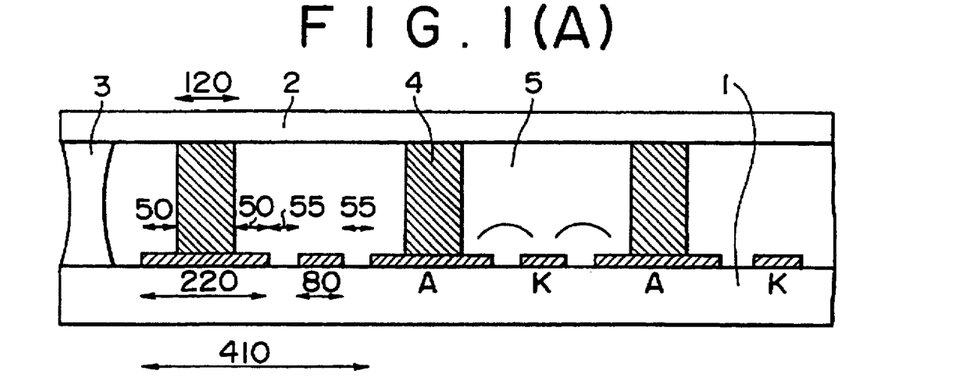
FIGS. 1(A) to 1(D) are schematic partial sectional views showing the structure of a discharge chamber according to the present invention.

Referring first to FIGS. 1(A) to 1(D), there is shown a basic structure of a discharge chamber according to the present invention. Referring particularly to FIG. 1(A), the discharge chamber shown has a flat panel structure which includes a substrate 1 and another substrate 2 arranged in an opposing relationship to the substrate 1 with a predetermined gap left therebetween. The two substrates 1 and 2 are adhered airtight to each other with a seal member 3 interposed therebetween. A plurality of striped anodes A and cathodes K are arranged alternately on the lower side substrate 1. Further, a plurality of barrier ribs 4 are interposed between the two substrates 1 and 2. The barrier ribs 4 are arranged in a striped pattern to define gaps between them to form discharge channels 5. Ionizable gas is enclosed in the discharge channels 5. The anodes A are arranged just below the barrier ribs 4 and have a width dimension greater than the width dimension of the barrier ribs 4. Accordingly, the anodes A are covered at middle portions thereof with the barrier ribs 4, but are exposed at the opposite side edge portions thereof. The cathodes K are each arranged intermediately between adjacent ones of the barrier ribs 4 and are entirely exposed in the discharge channels 5. Plasma discharge occurs when a predetermined voltage is applied between an anode A and a cathode K exposed in each of the discharge channels 5.

The discharge chamber having the structure described above can be manufactured by the following process. First, anodes A and cathodes K having individually predetermined width dimensions are formed alternately in a predetermined spaced relationship in a stripe pattern by a printing procedure on a surface of a substrate 1. Then, barrier ribs 4 having a width dimension smaller than the width dimension of the anodes A are formed in an overlapping relationship only with the anodes A by a printing procedure. Finally, an upper side substrate 2 is adhered airtight to the substrate 1 with the barrier ribs 4 interposed therebetween, and ionizable gas is enclosed between the two substrates 1 and 2.

Referring continuously to FIG. 1(A), the detailed pattern dimensions will be described by way of an example. In order to facilitate comparison with the conventional arrangement described hereinabove with reference to FIG. 8(A), the plasma electrode arrangement pitch is set to 410 μm also in the present arrangement. Further, also the width dimensions of openings provided between each cathode K and a pair of anodes A on the opposite sides of the cathode K are set equally to 55 μm so that the total of the dimensions may be 110 μm, which is equal to that in the conventional arrangement shown in FIG. 8(A). In this connection, the width dimension of the anodes A is 220 μm, and the width dimension of the cathodes K is 80 μm. Accordingly, the exposure width of the cathodes K is greater than 60 μm which is a minimum dimension necessary for plasma discharge. On the other hand, the width dimension of the barrier ribs 4 is set to 120 μm, and the exposure width of 50 μm of the anodes A is assured on the opposite sides of each barrier rib 4.

Figure 1B:
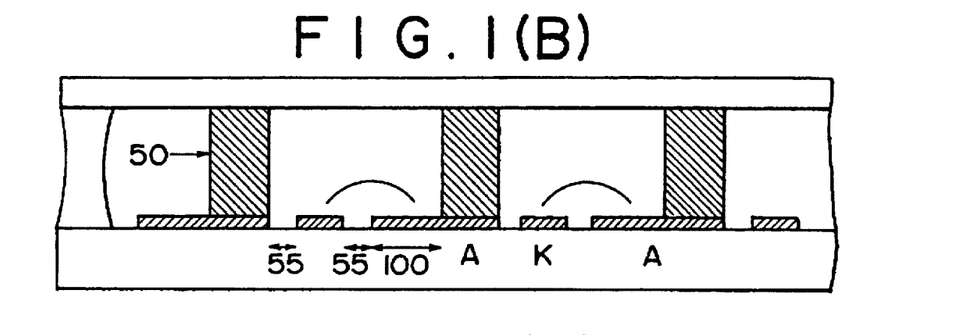

FIG. 1(B) shows the discharge chamber which involves positional displacement of 50 μm in the rightward direction from the condition shown in FIG. 1(A) in which the anodes A and the barrier ribs 4 are aligned with each other. In this instance, the exposure width of the anodes K exhibits no variation and also the opening width presents no decrease. The exposure width of each anode A is reduced, on one side thereof, to 0 μm but increased, on the other side thereof, to 100 μm, and consequently remains fixed as a whole in the discharge channel. In this manner, even if each barrier rib suffers from positional displacement of 50 μm to the utmost, the surface area of the corresponding cathode K is not influenced by such positional displacement, and consequently, the discharge current through the discharge channel is kept fixed. On the other hand, since each of the anodes A is required only to discharge therefrom, it is required only to assure a totally predetermined surface area for each cathode K. In the present arrangement, if the surface area of a left side anode A with respect to a certain cathode K decreases, then the surface area on another right side anode A increases by an equal amount, and consequently, the total area is kept fixed. In this manner, while the allowable range of positional displacement is ±30 μm with the conventional discharge chamber, even if the positional displacement exhibits such a great amount as ±50 μm with the discharge chamber of the present invention, it does not have a bad influence upon the discharge characteristic or the opening rate at all, and the allowability for the positional displacement is improved remarkably.

Figure 1C:
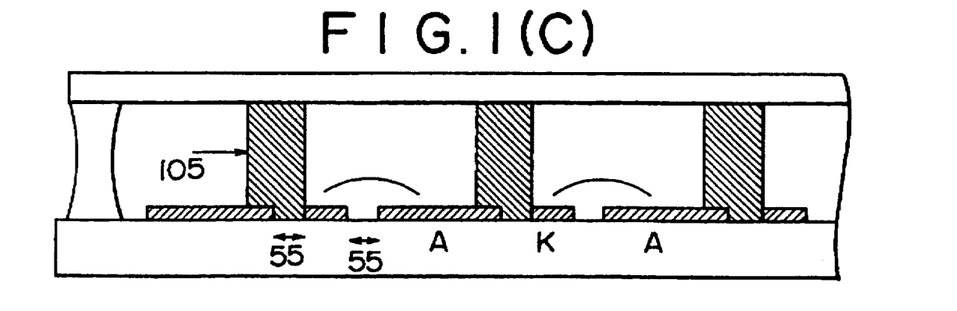

FIG. 1(C) illustrates a further condition wherein the barrier ribs are displaced by 105 μm from the condition shown in FIG. 1(A). Also in this instance, the exposed surface area of each cathode K is not influenced by the positional displacement, and also the exposed surface area of each anode A is kept greater than a predetermined value.

Figure 1D:
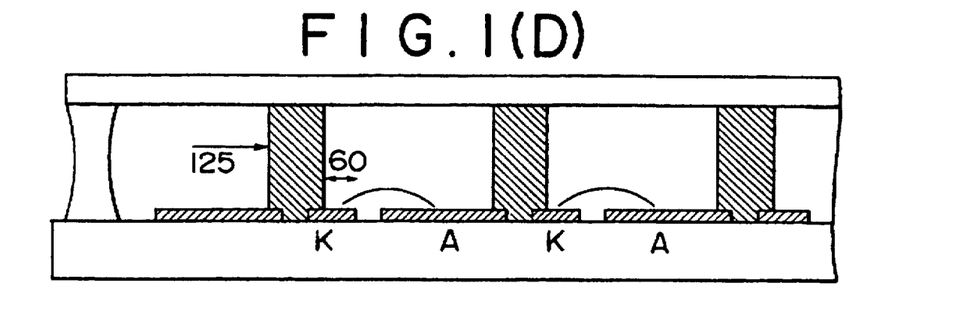

FIG. 1(D) illustrates a still further condition wherein the barrier ribs are displaced by 125 μm from the aligned condition shown in FIG. 1(A). In this instance, while the surface of each cathode K is partially covered with a barrier rib 4, the exposure width of 60 μm is still assured. Accordingly, stable plasma discharge can still be maintained. In this manner, as regards only the stability of plasma discharge, the positional displacement of up to ±125 μm can be permitted. To the contrary, if the error range of positional displacement is controlled to ±30 μm similarly as in the conventional arrangement, then the opening rate can be increased as much.

Figure 2:
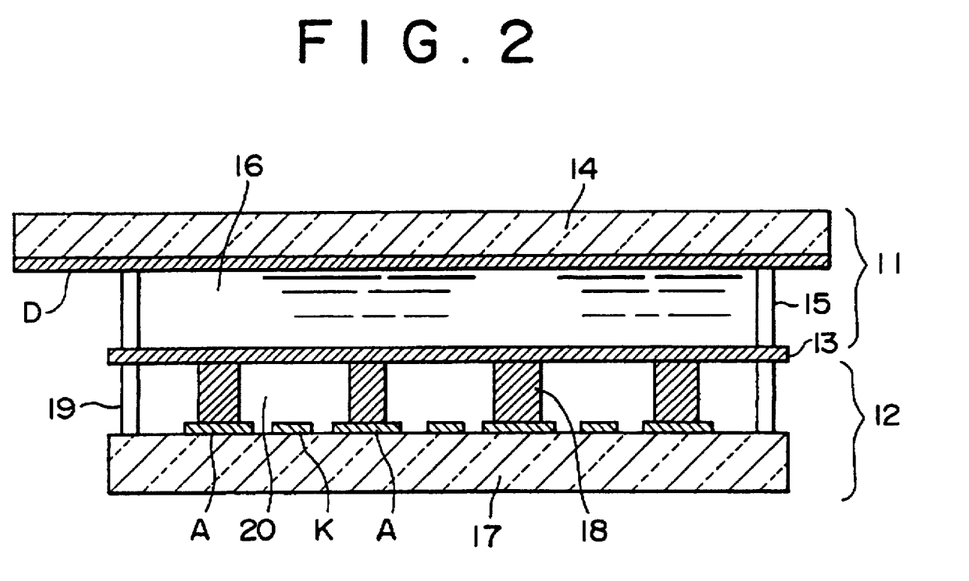
FIG. 2 is a schematic sectional view showing a plasma addressed display device assembled using a discharge chamber according to the present invention.

Subsequently, a plasma addressed display device in which the discharge chamber according to the present invention is incorporated as described hereinabove will be described with reference to FIG. 2. The plasma addressed display device has a flat panel structure wherein a display chamber 11, a discharge chamber 12, and a common intermediate substrate 13 formed from a very thin dielectric sheet are layered with each other with the intermediate substrate 13 interposed between the display chamber 11 and the discharge chamber 12. The display chamber 11 is constructed using an upper side glass substrate 14, and a plurality of signal electrodes D made of a transparent conductive film are formed on an inner side major surface of the display chamber 11 such that they extend in parallel to each other in the direction of a column of a matrix. The glass substrate 14 is adhered to the intermediate substrate 13 with a predetermined gap left therebetween by means of a spacer 15. A liquid crystal layer 16 is filled and enclosed in the gap.

Meanwhile, the discharge chamber 12 is constructed using a lower side glass substrate 17. Anodes A and cathodes K are alternately formed on an inner side major surface of the substrate 17 in the direction of a row of the matrix. Further, a barrier rib 18 is formed on and along each of the anodes A. The barrier ribs 18 contact at top ends thereof with the intermediate substrate 13 and serve as a spacer. The lower side glass substrate 17 is adhered to the intermediate substrate 13 using a seal member 19. An airtight enclosed gap is formed between the lower side glass substrate 17 and the intermediate substrate 13. The gap is sectioned or partitioned by the barrier ribs 18 such that discharge channels 20 are formed individually and make row scanning units. In particular, each of the discharge channels 20 includes a pair of anodes A formed in parallel to each other on the substrate 17, a single cathode K formed between the anodes A, and a pair of barrier ribs 18 having a width dimension smaller than the width dimension of each anode A and formed in alignment with corresponding anodes A. Ionizable gas is enclosed in the inside of the airtight discharge channels 20. The type of the gas can be selected from, for example, helium, neon, argon or any mixture of the gases.

Figure 3:
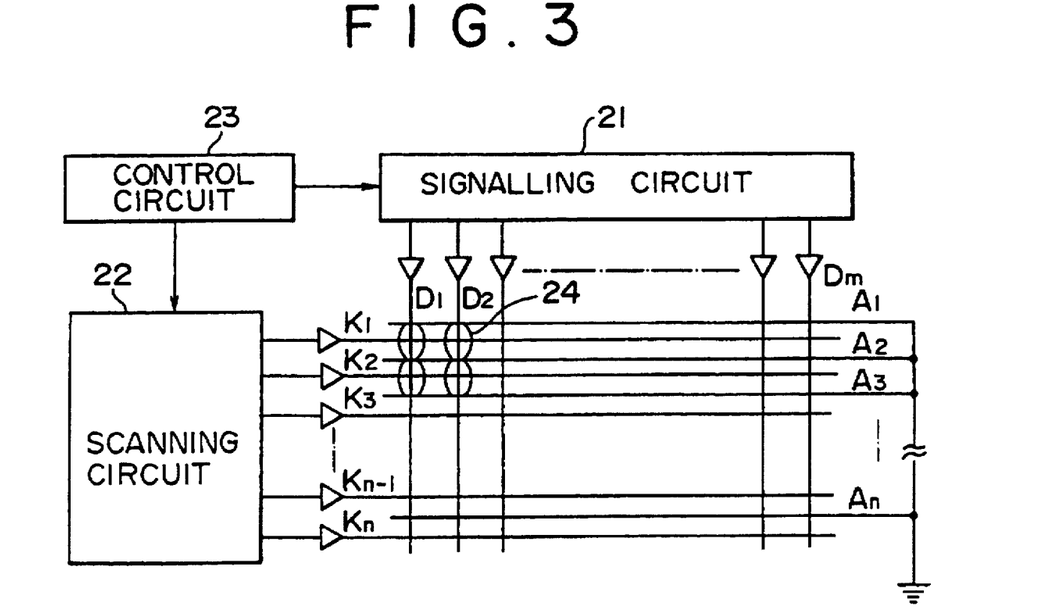
FIG. 3 is a block diagram showing a driver circuit for the plasma addressed display device shown in FIG. 2.

Finally, operation of the plasma addressed display device will be described briefly for reference with reference to FIG. 3. FIG. 3 shows an example of a driver circuit which may be used for the display device of FIG. 2. The driver circuit shown includes a signalling circuit 21, a scanning circuit 22, and a control circuit 23. Signal electrodes D1 to Dm are connected to the signalling circuit 21 by way of respective buffers. Meanwhile, cathodes K1 to Kn are connected to the scanning circuit 22 similarly by way of respective buffers. The anodes A1 to An are grounded commonly. The cathodes K1 to Kn are scanned in a line sequential relationship by the scanning circuit 22, and the signalling circuit 21 supplies analog image signals to the signal electrodes D1 to Dm in synchronism with the line sequential scanning. The control circuit 23 effects synchronization control of the signalling circuit 21 and the scanning circuit 22. A discharge channel is formed along each cathode K1 to Kn and makes a row scanning unit. Meanwhile, each signal electrode D1 to Dm makes a column driving unit. Picture elements 24 are defined between the row scanning units and the column driving units.

Figure 4:
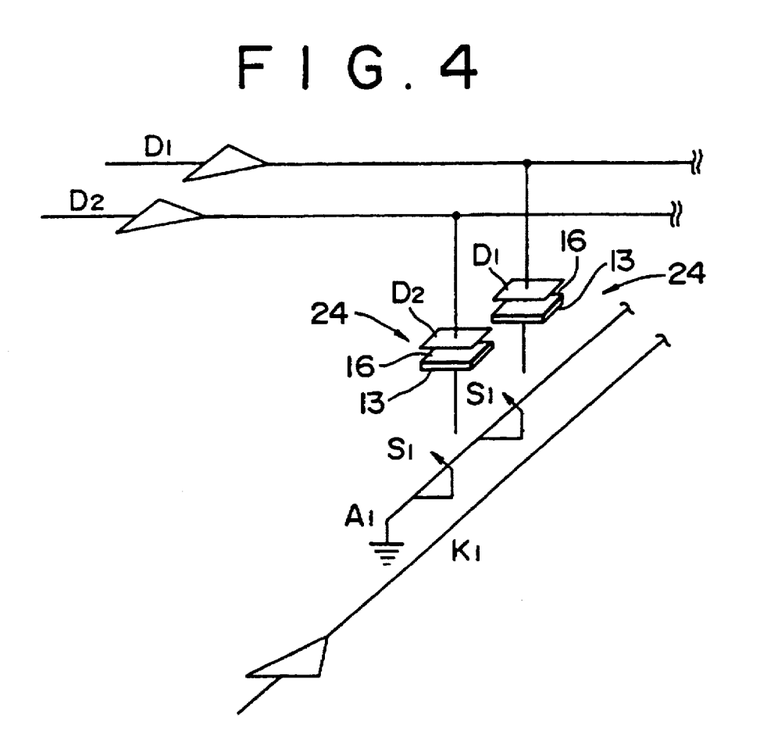
FIG. 4 is a diagrammatic view showing picture elements shown in FIG. 3.

FIG. 4 diagrammatically shows two picture elements 24 picked up from FIG. 3. Each picture element 24 is constituted from a series connection of a sampling capacitor formed from the liquid crystal layer 16 held between the signal electrode D1 or D2 and the intermediate substrate 13 and a plasma sampling switch S1. The plasma sampling switch S1 equivalently represents the function of a discharge channel. In particular, if the discharge channel is activated, then the inside thereof is substantially entirely connected to the anode potential. On the other hand, when the plasma discharge comes to an end, the discharge channel exhibits a floating potential. Analog image signals are written into the sampling capacitors of the individual picture elements 24 by way of the sampling switches S1 to effect so-called sampling holding. Gradient lighting or extinction of each picture element 24 can be controlled in accordance with the level of the analog image signal.

Having now fully described the invention, it will be apparent to one of ordinary skill in the art that many changes and modifications can be made thereto without departing from the spirit and scope of the invention as set forth herein.

What is claimed is:

1. A method of manufacturing a discharge chamber which comprises first and second substrates defining therebetween a space filled with an ionizable gas, comprising the steps of:

forming a plurality of striped electrodes on a surface of the first substrate by a printing procedure, said electrodes comprising anodes and cathodes;

forming a plurality barrier ribs on the anodes by a printing procedure so that each of the barrier ribs has a width smaller than the anodes, while leaving said cathodes free of said barrier ribs; and filling the space between the first and second substrates with the ionizable gas.

2. A method of manufacturing a discharge chamber as claimed in claim 1, wherein said barrier ribs are located so as to define a plurality of plasma discharge channels.

3. A method of manufacturing a discharge chamber comprising the steps of;

arranging first and second substrates having first and second facing surfaces respectively, arranged substantially in parallel to each other, defining a space therebetween;

applying a plurality of spaced apart anodes on said first substrate;

applying a plurality of cathodes on said first substrate, each of which is between a pair of anodes;

applying a plurality of barrier ribs onto said anodes end extending toward said second substrate, to define a plurality of plasma discharge channels, while leaving said cathodes free of said barrier ribs; and filling said space with an ionizable gas.

4. The method according to claim 3, wherein said anodes and cathodes are formed on said substrate using a thick film printing procedure using a screen mask.

5. The method according to claim 4, wherein said barrier ribs are formed on said anodes using a thick film printing procedure using a second screen mask.

6. The method according to claim 3, wherein said barrier ribs have a width dimension smaller than said anodes.

7. The method according to claim 3, wherein said anode is applied at a pitch of approximately 410 µm, and a width dimension between said cathode and respective anodes on opposite sides of said each cathode is approximately 55 µm, and the width dimension of each anode is approximately 220 µm and the width dimension of each cathode is approximately 80 µm, and the width dimension of each barrier rib is approximately 120 µm.

* * * * *